United States Patent
Wang et al.

(10) Patent No.: US 7,505,291 B2
(45) Date of Patent: Mar. 17, 2009

(54) AC/DC CONVERTER CAPABLE OF ACTIVELY RESTRAINING AN INRUSH CURRENT

(75) Inventors: Jin-Biau Wang, Tamshui Chen (TW); Jacob Teng, Tamshui Chen (TW); Hung-Tao Lee, Tamshui Chen (TW); Kuen-Lung Tsai, Tamshui Chen (TW); Han-Wei Chen, Tamshui Chen (TW); Shih-Hao Tsai, Tamshui Chen (TW); Ming-Yung Peng, Tamshui Chen (TW)

(73) Assignee: Acbel Polytech Inc., Tamshui Chen, Taipei Hsien (TW)

( * ) Notice: Subject to any disclaimer, the term of this patent is extended or adjusted under 35 U.S.C. 154(b) by 203 days.

(21) Appl. No.: 11/357,828

(22) Filed: Feb. 17, 2006

(65) Prior Publication Data
US 2007/0053215 A1   Mar. 8, 2007

(30) Foreign Application Priority Data
Sep. 6, 2005   (TW) ................... 094130628

(51) Int. Cl.
*H02M 7/44* (2006.01)

(52) U.S. Cl. .............. 363/89; 363/15; 363/34; 363/37; 363/49; 363/53

(58) Field of Classification Search .......... 363/53, 363/15, 34, 37, 49, 50, 89; 323/222, 908
See application file for complete search history.

(56) References Cited

U.S. PATENT DOCUMENTS

| | | | | |
|---|---|---|---|---|
| 4,236,198 A | * | 11/1980 | Ohsawa et al. ............... | 363/49 |
| 5,715,154 A | * | 2/1998 | Rault .......................... | 363/89 |
| 6,157,097 A | * | 12/2000 | Hirose et al. ................ | 307/125 |
| 6,714,429 B2 | * | 3/2004 | Phadke ........................ | 363/89 |
| 2002/0191426 A1 | * | 12/2002 | Hussein et al. ............... | 363/50 |
| 2003/0035311 A1 | | 2/2003 | Phadke ........................ | 363/89 |

FOREIGN PATENT DOCUMENTS

| | | |
|---|---|---|
| CN | 1055263 | 10/1991 |
| JP | 10-155272 | 6/1998 |

* cited by examiner

*Primary Examiner*—Akm E Ullah
*Assistant Examiner*—Nguyen Tran
(74) *Attorney, Agent, or Firm*—patenttm.us (57) ABSTRACT

An AC/DC converter includes a rectifier circuit, at least one restraining unit, and a power interruption detection circuit. The rectifier circuit is used for converting an AC (alternating current) to a DC (direct current) power source. The restraining unit is connected to an output terminal of the AC power supply. The restraining unit includes a resistor and a switch connected in parallel. The power interruption detection circuit detects whether an input power cycle is regular. When the input power cycle is interruptive, a signal is generated to change a state of the switch in the restraining unit to make the resistor of the interfere in the circuit to restrain an inrush current in any operational circumstance, such as warm startup or quick startup.

2 Claims, 12 Drawing Sheets

| inputs | | | Outputs | |
|---|---|---|---|---|
| Clear | A | B | Q | Q̄ |
| L | X | X | L | H |
| X | H | X | L | H |
| X | X | L | L | H |
| H | L | ↑ | ⊐⌐ | ⌐⊐ |
| H | ↓ | H | ⌐⊐ | ⊐⌐ |

AC/DC CONVERTER CAPABLE OF ACTIVELY RESTRAINING AN INRUSH CURRENT

BACKGROUND OF THE INVENTION

1. Field of the Invention

The invention relates in general to an AC/DC converter capable of actively restraining an inrush current, and more particularly an AC/DC converter that can effectively restrain an inrush current in any working environment and on any occasion, so as to ensure the stability of a power supply.

2. Description of the Related Art

Figure 12:
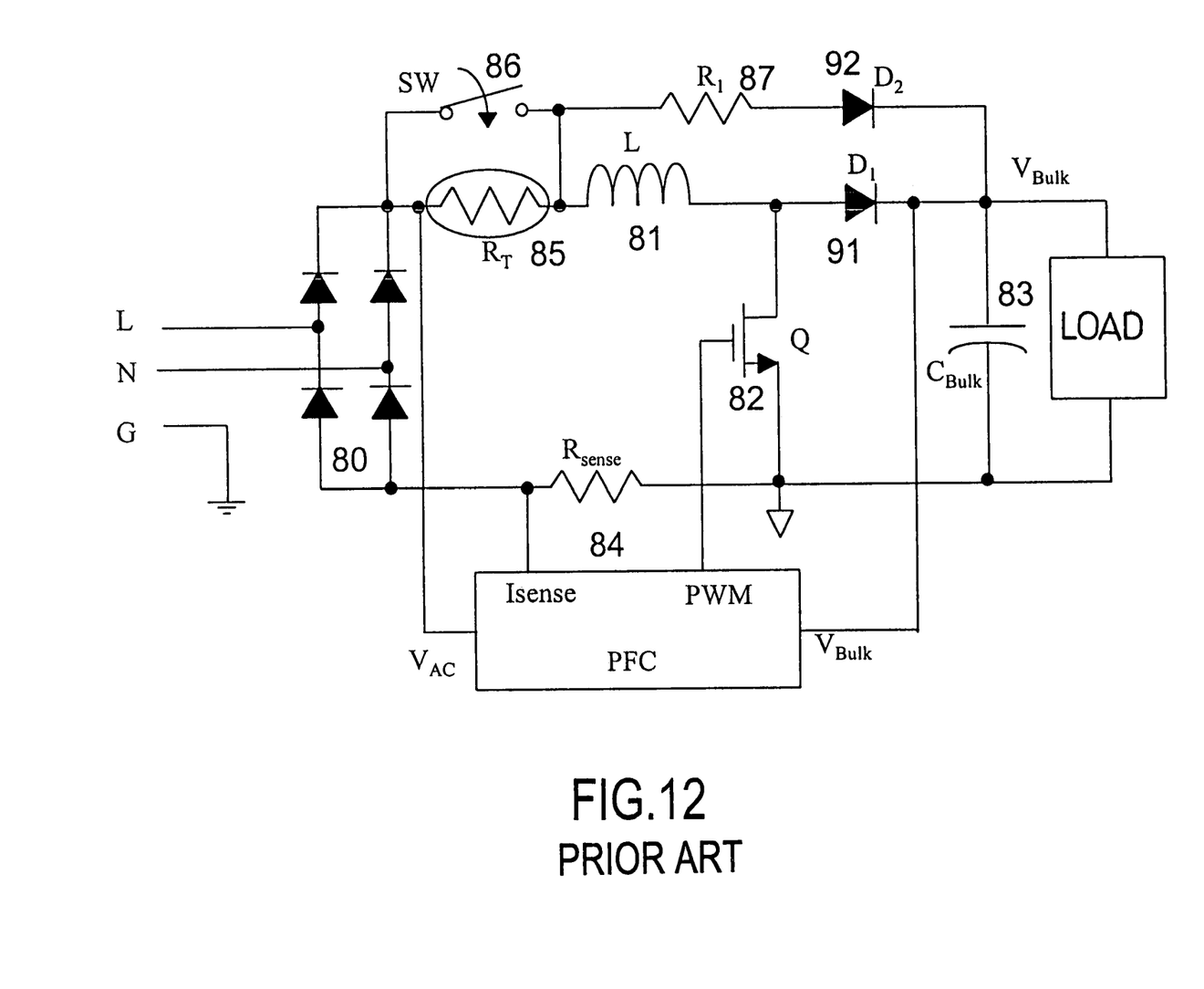
FIG. 12 shows a circuit diagram of a conventional AC/DC converter.

With reference to FIG. 12, an AC/DC converter for a power supply includes a bridge rectifier 80, an inductor 81, a power transistor 82, a diode and a capacitor 83. The bridge rectifier 80 is used for converting AC power to DC power. The inductor 81 is connected to the bridge rectifier 80. A power factor and pulse width modulation controller 84 controls the power transistor 82. An auxiliary charge circuit including a resistor R1 and a diode D1 assists the capacitor 83 to charge. A main function of the auxiliary charge circuit is to setup an appropriate voltage of the capacitor 83 before a power factor correction circuit starts, so that an auxiliary power source can operate accurately.

An inrush current occurs when the power supply starts because the capacitor 83 has no charge. A conventional technique to prevent components from being damaged by the inrush current is to use a thermal resistor 85 connected between an output terminal of the bridge rectifier 80 and the inductor 81. Two terminals of the thermal resistor 85 are connected in parallel to an electrical switch 86 to determine an occasion to interrupt the circuit. The auxiliary power source inside the power supply controls the electrical switch 86 to switch on or off.

Figure 13:
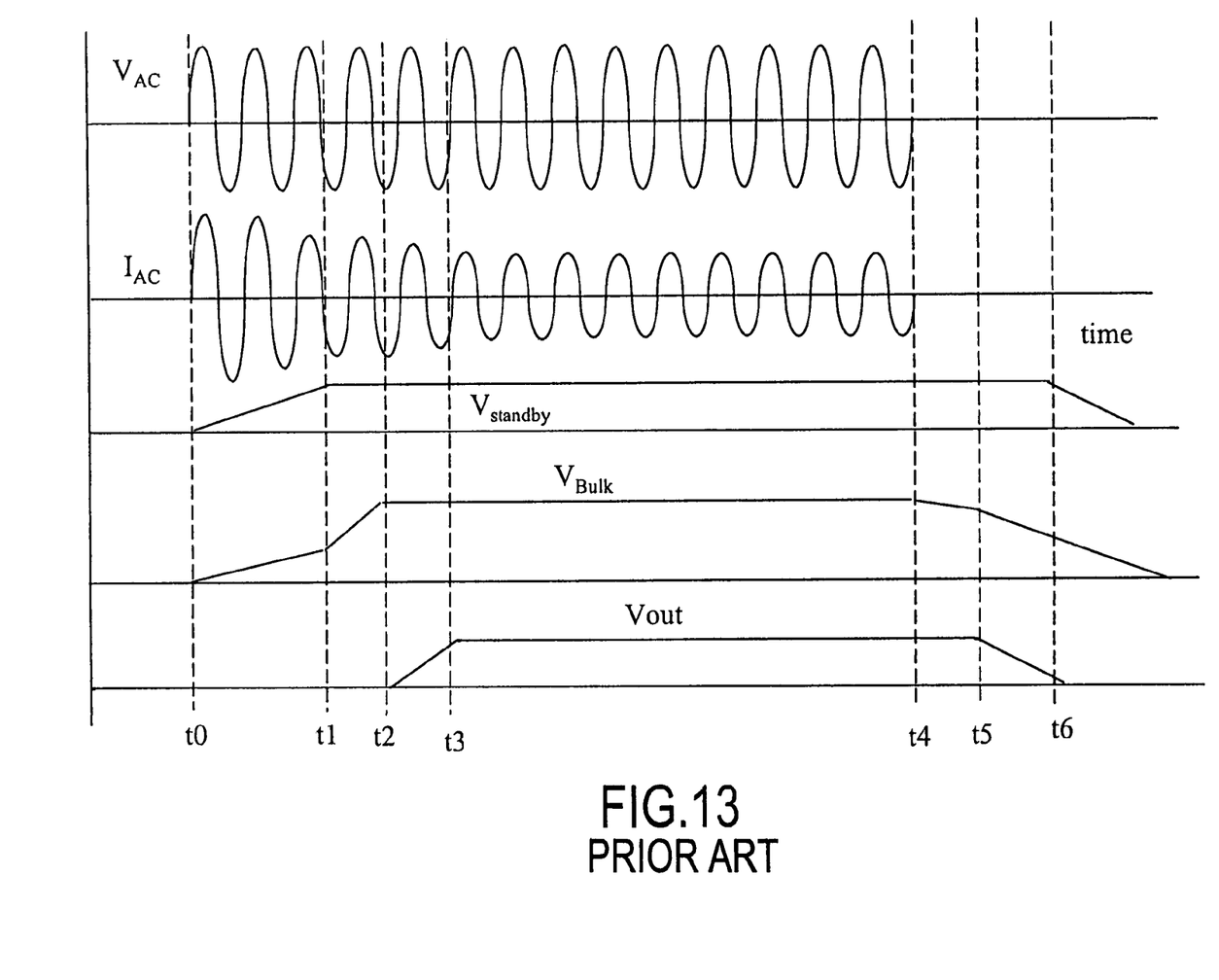
FIG. 13 shows an oscillogram of a standard start-up operation of a power supply.

With reference to FIG. 13, a standard start-up timing diagram of a power supply is illustrated. An AC power source VAC starts to be input to the power supply on startup. The capacitor 83 is charged through the thermal resistor 85, the inductor 81, the resistor R1, and the diodes D1, D2. A voltage $V_{Bulk}$ gradually rises until it reaches a certain voltage value. The curve of the voltage $V_{Bulk}$ in the diagram shows that the inrush current has been effectively restrained. Next the auxiliary power source $V_{standby}$ starts and gradually rises until it reaches a set voltage for a period of time. Then the power supply starts to supply an output voltage $V_{out}$.

The electrical switch 86 that controls whether or not the thermal resistor 85 should interfere in the circuit is controlled by the auxiliary power source and related circuits. The electrical switch 86 is opened before the power startup. That is to say, the thermal resistor 85 connected between the bridge rectifier 80 and the inductor 81 can restrain the inrush current after the power startup despite the capacitor having no charge. Because the inrush current only occurs at an instance of startup, after the power supply operates normally the thermal resistor 85 must be separated from the circuit, so that the thermal resistor 85 will not reduce efficiency. Therefore the electrical switch 86 closes when the auxiliary power source of the power supply is setup. The DC power then immediately goes through the electrical switch 86 to the inductor 81 without passing through the thermal resistor 85.

The aforesaid technique to control the inrush current is practicable. However, the aforesaid technique is limited and has drawbacks in practice. To be specific, the aforesaid technique is only suitable for cold startup, which refers to startups from a total power off state. During warm startups, especially occasions of warm startup reboots, the aforesaid technique may lose efficacy. The root cause is because the electrical switch 86 is controlled by the auxiliary power source. As shown in FIG. 13, even though the AC power source $V_{AC}$ interrupts, the auxiliary power source $V_{standby}$ still continues for a period of time of t4-t6. In other words, during the AC power source $V_{AC}$ interruption or warm startup, the electrical switch 86 still remains closed since the auxiliary power source $V_{standby}$ continues to supply power. This indicates that the thermal resistor 85 is isolated from the circuit. Hence the thermal resistor 85 is unable to restrain the inrush current in the aforesaid occasions.

Figure 14:
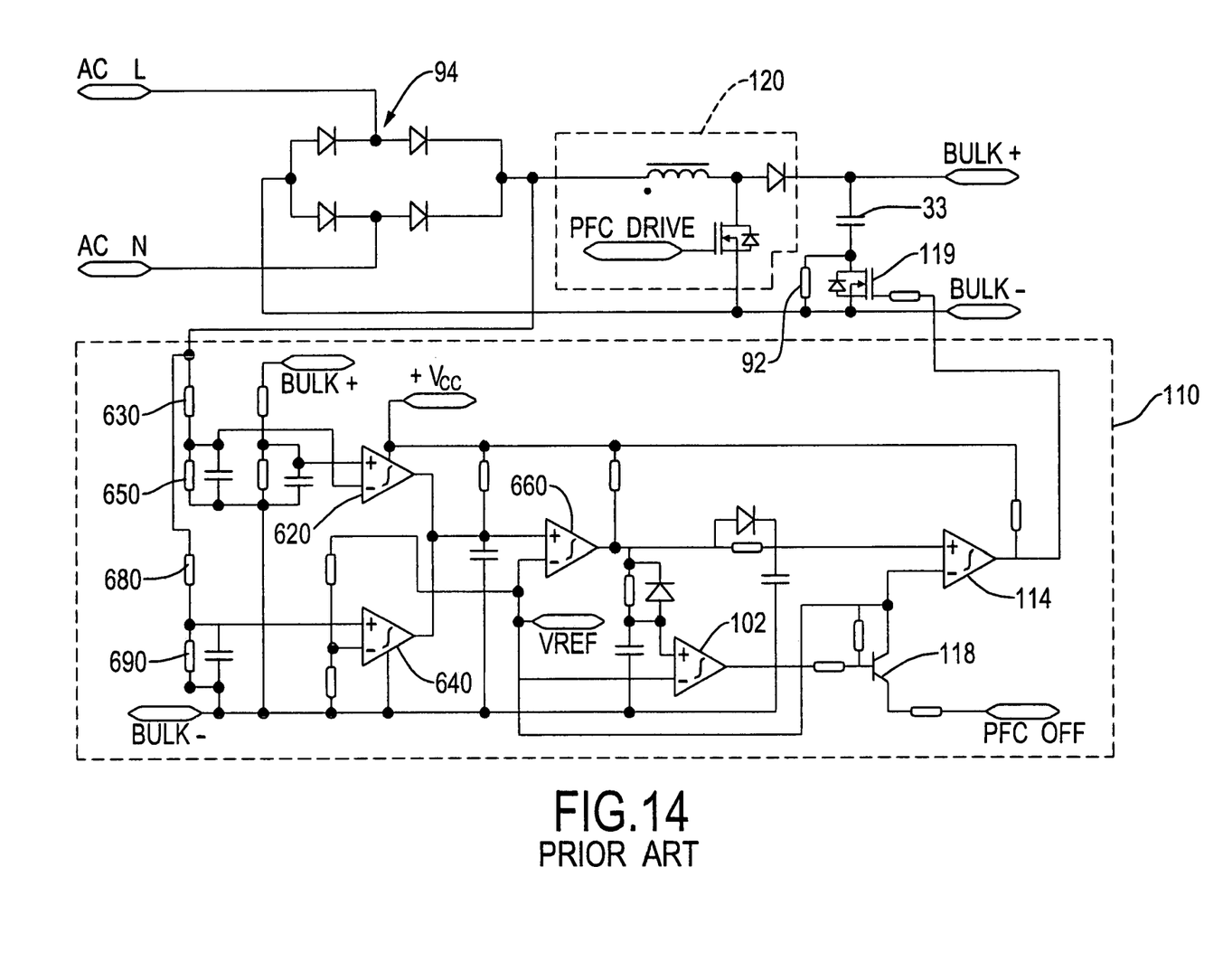
FIG. 14 shows a circuit diagram of an AC/DC converter disclosed in U.S. Patent Application No. 2003/0035311.

FIG. 14 illustrates a method and circuit for controlling inrush current disclosed in an U.S. Patent Application No. 2003/0035311. A circuit in this patent includes a bridge rectifier 94, a boost converter 120, a capacitor 33 connected between positive and negative power terminals and a resistor 92 arranged from AC power terminals AC L and AC N to power output terminals BULK+, BULK− in sequence. The resistor 92 is connected in parallel with a switch transistor 119. A gate of the switch transistor 119 is connected to a control circuit 110 for controlling inrush current.

The control circuit 110 for controlling the inrush current includes comparators 620, 640, 660, 102, 114 and a transistor 118. Input terminals of the two comparators 620, 640 located at a front end are connected to an output terminal of the bridge rectifier 94 through voltage divider resistors 630, 650, 680, 690 to detect an output current variation. When an output current the bridge rectifier 94 goes through the comparators 620, 640, 660, 102, 114 to be compared until the voltage exceeds a predetermined threshold, the inrush current occurs. At this moment, the comparator 114 outputs a low voltage to make the switch transistor 119 open, and the resistor 92 becomes connected in series with the capacitor 33, so as to restrain the inrush current.

However, although the aforesaid technique can restrain the inrush current during startup; there is still a drawback to this technique. The terminal voltage BULK+ of the capacitor 33 is supposed-to be rising gradually. When the resistor 92 interferes with the circuit, the current goes through the resistor 92, and thereby the voltage BULK+ rises abruptly. Hence the terminal voltage BULK+ of the capacitor 33 encounters excess voltage and is likely to impact a voltage tolerance of the capacitor 33.

SUMMARY OF THE INVENTION

The present invention provides an AC/DC converter including a rectifier circuit, at least one restraining unit, and a power interruption detection circuit. The rectifier circuit is used for converting an AC (alternating current) to DC (direct current). The restraining unit is configured at an output terminal of the AC power. The restraining unit includes a resistor and a switch connected in parallel. The power interruption detection circuit is used for detecting whether or not an input power cycle is regular. When the input power cycle is interruptive, a signal is generated to change a switch state of a restraining unit to make the resistor of the restraining unit interfere in the circuit to restrain a current surge during any operational occasions such as warm startup or quick startup.

The present invention uses the power interruption detection circuit to detect whether or not the AC power wave cycle is regular, so as to determine whether the thermal resistor of the restraining units should interfere in the circuit to restrain the current surge when the power supply recovers. By using the present invention, the conventional art that is unable to handle the temporary power-off state of warm startup or quick startup can be improved. According to the present invention, during the temporary power-off state, the power interruption detection circuit can immediately detect the interruption of the AC power wave cycle and make the thermal resistor of the restraining unit interfere in the circuit at once. Hence the current surge can be effectively restrained in any operational circumstance, so as to ensure stability of the power supply.

DETAILED DESCRIPTION OF THE INVENTION

Figure 1:
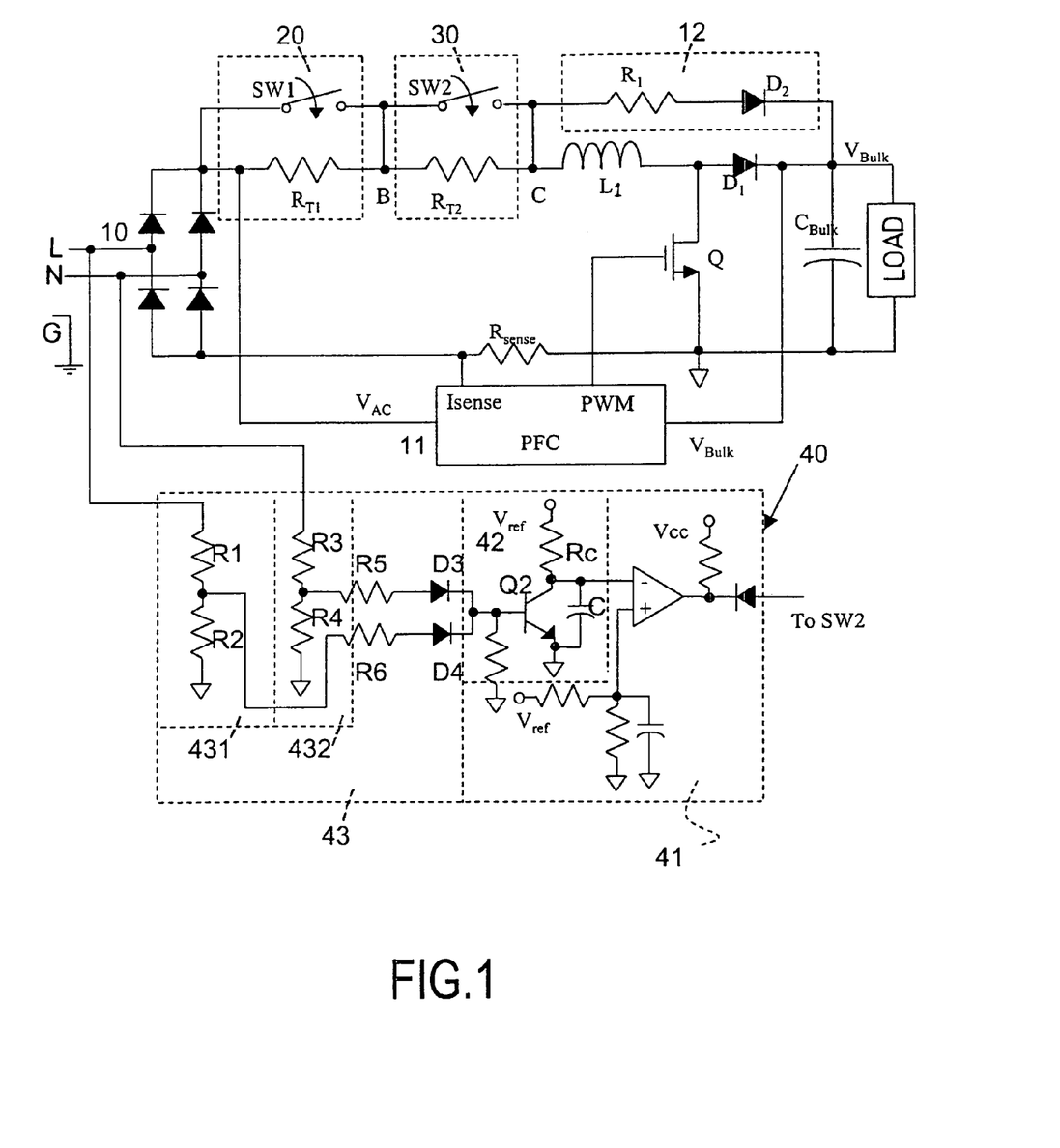
FIG. 1 shows a circuit diagram of a first embodiment of the AC/DC converter in accordance with the present invention.

With reference to FIG. 1, a detailed circuit diagram of a first embodiment of the present invention mainly includes a rectifier circuit 10, a first restraining unit 20, a second restraining unit 30 and a power interruption detection circuit 40. The present invention operates in coordination with an active power factor correction circuit. The rectifier circuit 10 made up by a bridge rectifier is connected to an AC (alternating current) power source L, N, so as to convert an AC to a DC (direct current) power source. The DC power output terminal of the rectifier circuit 10 is connected to the first restraining unit 20, the second restraining unit 30, an inductor L1 and a diode D1.

A wiring terminal of the inductor L1 and the diode D1 is connected to a power transistor Q. A gate of the power transistor Q is connected to a power factor and pulse width modulation controller 11 configured inside the power supply. The power factor and pulse width modulation controller 11 controls the gate of the power transistor Q. The power factor and pulse width modulation controller 11 further acquires a detected current $I_{sense}$ through a resistor $R_{sense}$ configured at a negative power source terminal. Moreover, a capacitor $C_{Bulk}$ is connected between a cathode of the diode D1 and the negative power source terminal. In this embodiment, an auxiliary circuit 12 is connected in parallel to the inductor L1 and the diode D1. The auxiliary circuit 12 is made up of a resistor R1 and a diode D2 to provide an auxiliary recharge circuit when the power is turned on, so as to set up an auxiliary power source for the power supply instantly.

The first restraining unit 20 includes a resistor $R_{T1}$ and an electrical switch SW1. The resistor $R_{T1}$ can be a general resistor or a thermal resistor. The thermal resistor is used in the present embodiment. Further, the electrical switch SW1 is normally open before the power is turned on, and the electrical switch SW1 still remains open after the power is turned on, so that the thermal resistor $R_{T1}$ can restrain an inrush current during start-up. When the auxiliary power source of the power supply is setup, the auxiliary power source is used to control the electrical switch SW1 to close the circuit. When the power is turned off, the auxiliary power source stops and the electrical switch SW1 recovers to its normally open position.

Since the first restraining unit 20 is known to the public and is not a feature in the present invention, herein a detailed introduction of the first restraining unit 20 is omitted. However, the second restraining unit 30 is newly added to co-operate with the first restraining unit 20. The preferred embodiment of the present invention is not limited to the above-description. The second restraining unit 30 can still operate independently without co-operating with the first restraining unit 20.

One, or more than one, second restraining unit 30 can be included in the embodiment. The second restraining unit 30 is mainly made up of a resistor $R_{T2}$ and an electrical switch SW2 connected to the resistor $R_{T2}$ in parallel. The resistor $R_{T2}$ can be a general resistor or a thermal resistor. The thermal resistor is used in the present embodiment.

The difference between the first restraining unit 20 and the second restraining unit 30 is that the electrical switch SW2 of the second restraining unit 30 is controlled by the power interruption detection circuit 40. The power interruption detection circuit 40 is used for detecting whether or not an input power cycle is regular when the power supply is started up, so as to determine whether or not the input power cycle is interruptive, especially in a temporary power-off state of warm startup or quick startup.

The power interruption detection circuit 40 includes a comparison circuit 41, an integrating circuit 42 and an AC synchronous signal detection circuit 43. The comparison circuit 41 is made up of a comparator having a positive input terminal connected to a reference voltage source Vref by a voltage divider circuit to acquire the reference voltage value and an output terminal connected to the electrical switch SW2. The integrating circuit 42 includes a resistor Rc, a capacitor C and a transistor Q2 connected in series. A node of the series-connected resistor Rc and the capacitor C is connected to a negative input terminal of the comparison circuit 41. The other terminals of the integrating circuit 42 are respectively connected to a reference voltage source Vref and a ground. The AC synchronous signal detection circuit 43 includes two input terminals connected to the AC power source terminals L, N respectively and has an output terminal connected to the integrating circuit 42.

In this embodiment, the AC synchronous signal detection circuit 43 is made up of an adder circuit and a voltage divider circuit. The adder circuit comprises two resistors R5, R6 to provide lightning protection. In this embodiment, the two resistors R5, R6 are respectively series-connected to two diodes D3, D4. Two cathodes of the two diodes D3, D4 are connected together and further connected to a base of the transistor Q2 of the integrating circuit 42.

The voltage divider circuit includes two voltage dividers 431, 432, which are respectively connected between the two AC power source terminals L, N and two input terminals of the adder circuit. The first voltage divider 431 comprises two voltage divider resistors R1, R2 and the second voltage divider 432 comprises two voltage divider resistors R3, R4. A signal of the base of the transistor Q2 is formed by the adder circuit to combine positive half-wave and negative half-wave of the AC power source terminals. An oscillogram of the signal of the base of the transistor Q2 is shown as a waveform A in FIG. 2.

The operation of the power interruption detection circuit 40 for detecting whether or not an input power cycle is regular is explained as follows. The AC synchronous signal detection circuit 43 is mainly a zero-crossing detecting circuit for generating a synchronous signal. Every AC power cycle (as shown by waveform D) generates two synchronous signals as the waveform A shown in FIG. 2 to reset the integrating circuit 42. If the power supply is interrupted, such as with a main electricity service interruption or a quick interruption and then recovery, the fixed-frequency synchronous signal will become abnormal and will be unable to use the fixed-frequency method to reset the integrating circuit 42. In this case, an output voltage of the integrating circuit 42 will exceed a default reference value, so as to detect the interruption of the wave cycle of the input power cycle.

Figure 2:
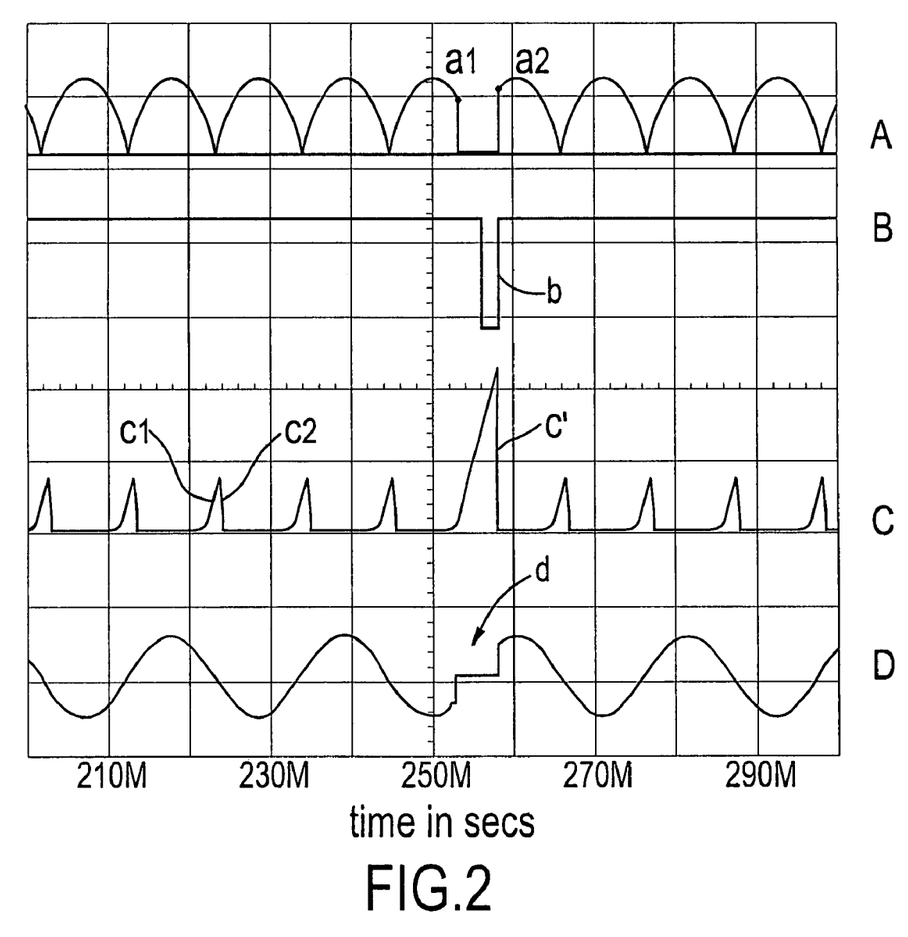
FIG. 2 shows an oscillogram of the waveforms of the AC/DC converter in FIG. 1.

Further, the integrating circuit 42 uses the reference voltage source Vref that goes through the resistor Rc to charge the capacitor C. With reference to FIG. 2, a waveform C reveals a charge voltage waveform of the capacitor C. A rising edge "c1" of the waveform C represents the capacitor C continues charging and the voltage is gradually rising. Further, a final end value voltage of the capacitor C is the reference voltage source Vref. Using the transistor Q2 to connect in parallel to two terminals of the capacitor C can discharge stored electricity in the capacitor C when the transistor Q2 is conductive, so as to make the voltage become zero. A falling edge "c2" of the waveform C illustrates a discharging state of the capacitor C. In this way, when the AC power source is normal, the AC synchronous signal detection circuit 43 generates the synchronous signal to trigger the transistor Q2 of the integrating circuit 42 to be conductive, so as to enable the charge voltage of the capacitor C to be reallocated every half cycle. Hence the charge voltage of the capacitor C will not exceed the default value in a normal power supply. An output signal of the comparison circuit 41 always remains at a high level as the waveform B in FIG. 2, which indicates that the second restraining unit 30 does not operate at this moment.

However, during the power loss period as shown in the position "d" of a waveform D in FIG. 2 for 5 ms, the synchronous waves also show a cycle loss state as positions a1~a2 in the waveform A in FIG. 2. At this moment, the transistor Q2 is unable to be conductive, so that the capacitor C continues charging as a position c' of the waveform C in FIG. 2. Hence the voltage of the capacitor C exceeds the default value instantly.

In this embodiment, the comparison circuit 41 is made up of a comparator. The capacitor C of the integrating circuit 42 is connected to a negative terminal of the comparator. When the voltage of the capacitor C exceeds a default value of a positive terminal input setting of the comparator, the output terminal of the comparison circuit 41 drops to a low level as shown in a position "b" in the waveform B of FIG. 2. In this way, the electrical switch SW2 of the second restraining unit 30 makes the thermal resistor $R_{T2}$ interfere in the circuit to restrain an inrush current.

Figure 3:
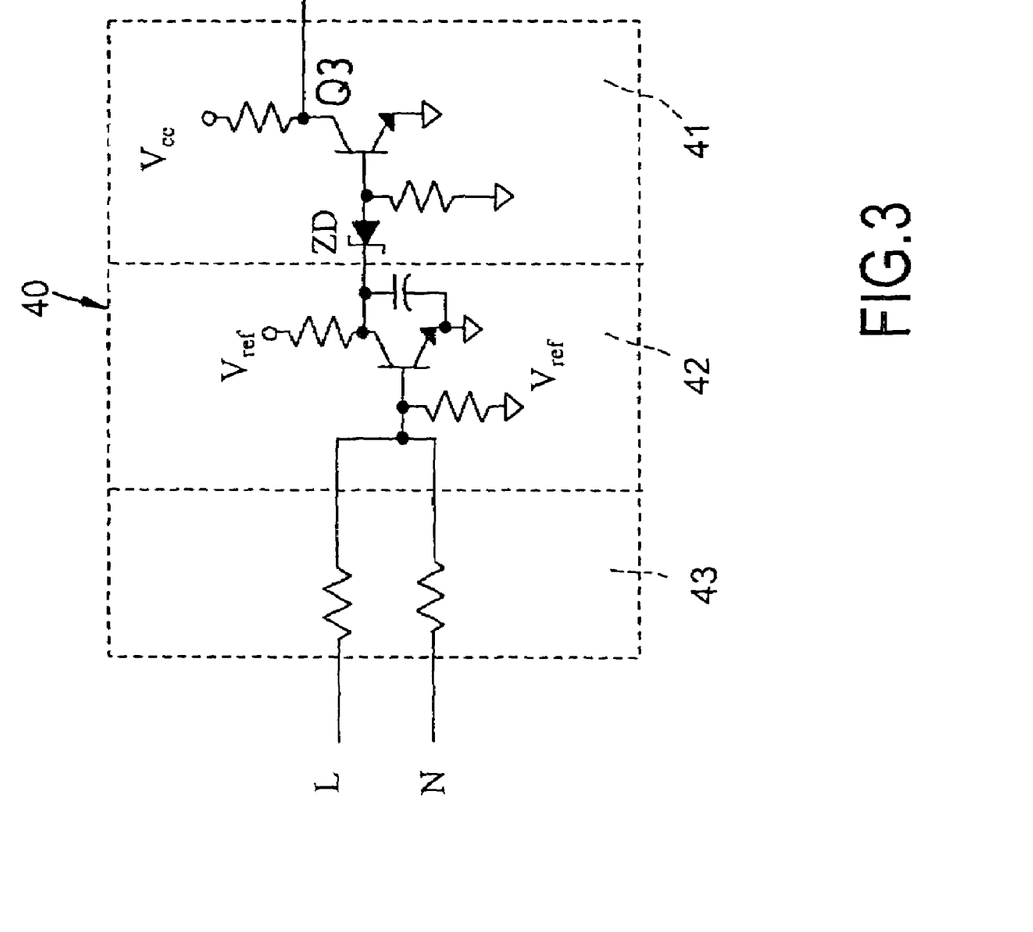
FIG. 3 shows a circuit diagram of a comparison circuit of a power interruption detection circuit of the AC/DC converter in FIG. 1.

With reference to FIG. 3, the comparison circuit 41 can be composed of a zener diode ZD and a transistor Q3. When the power supply is normal, the voltage of the capacitor C does not exceed a breakdown voltage of the zener diode ZD. A collector of the transistor Q3 remains at a high level. However, during the power loss period, the capacitor C is unable to be reallocated. Once the charge voltage of the capacitor C is higher than the breakdown voltage of the zener diode ZD, the transistor Q3 is conductive and the collector becomes a low level. Then the second restraining unit 30 is driven to make the thermal resistor $R_{T2}$ interfere in the circuit to restrain an inrush current immediately. A notable point is that the diode of the AC synchronous signal detection circuit 43 in FIG. 3 is omitted. An original rectifier diode of the AC/DC converter replaces the function of the diode.

Since the above-described power interruption detection circuit 40 uses the wave cycle to determine whether or not the input power cycle is normal, the power loss state can be immediately detected once the wave cycle shows a missing state. In this way, the thermal resistor $R_{T2}$ can immediately interfere in the circuit, so as to restrain an inrush current when the power is started up. Hence the above-mentioned measurement can be effectively used to prevent the inrush current in all kinds of operating conditions.

Figure 4:
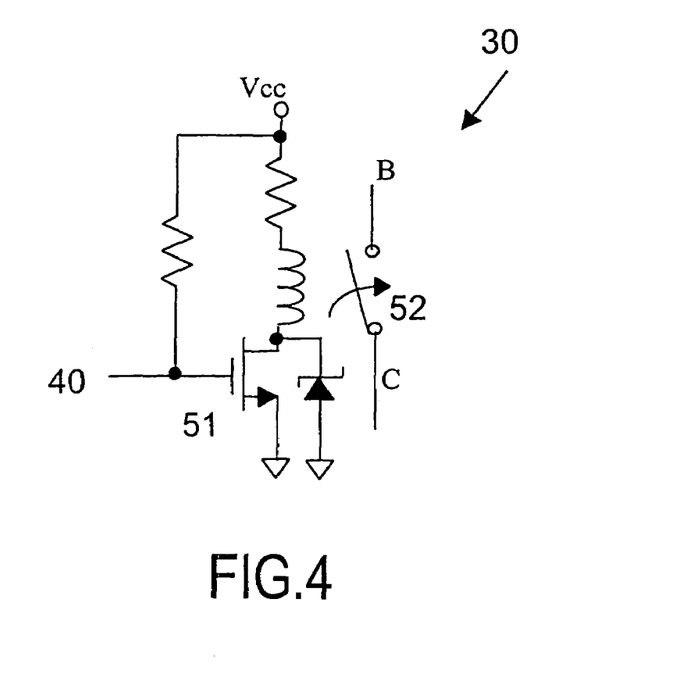
FIG. 4 shows a circuit diagram of a switch of a first embodiment in the AC/DC converter.

With reference to FIG. 4, a first embodiment of the electrical switch SW2 of the second restraining unit 30 mainly includes a power transistor 51 and a relay 52. A gate of the power transistor 51 is connected to the output terminal of the power interruption detection circuit 40, and a source is connected to a coil of the relay 52. Two contacts B and C of the relay 52 are connected in parallel to two terminals of the thermal resistor $R_{T2}$ as shown in FIG. 1. When the output electric potential of the power interruption detection circuit 40 changes, the power transistor 51 is also conductive or disconnected, so as to determine whether to conduct or to disconnect the contacts of the relay 52.

Figure 5:
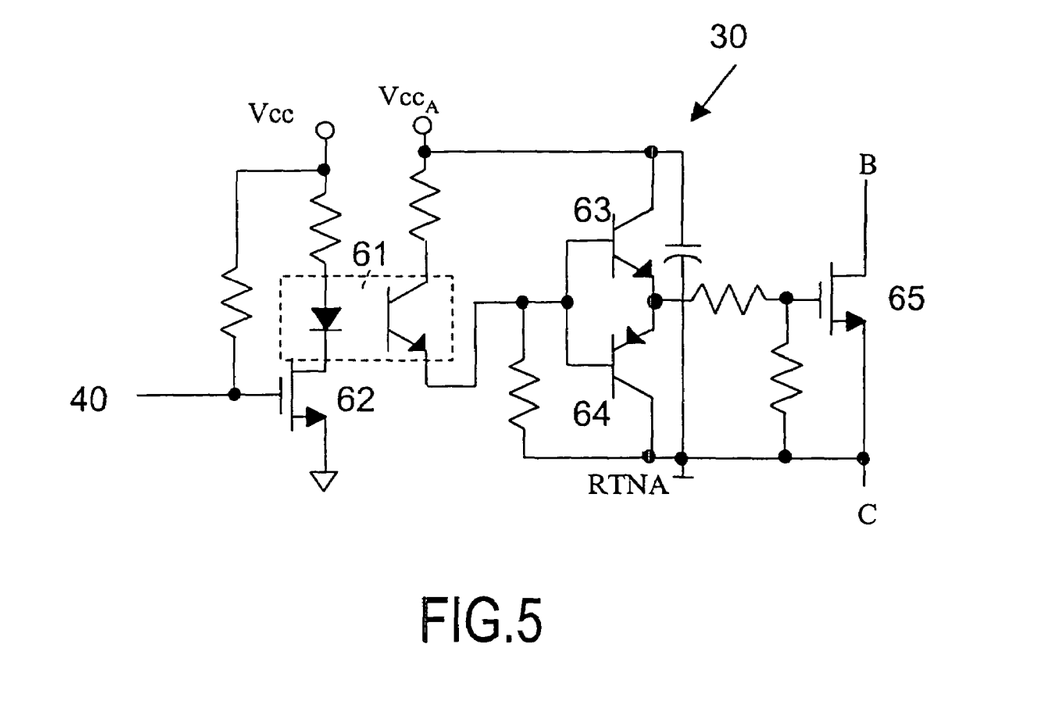
FIG. 5 shows a circuit diagram of a switch of a second embodiment in the AC/DC converter.

With reference to FIG. 5, a second embodiment of the electrical switch SW2 of the second restraining unit 30 comprises a photo coupler 61 with an input terminal connected to a first power transistor 62. The first power transistor 62 is controlled by the power interruption detection circuit 40. An output terminal of the photo coupler 61 is connected to a gate of a second power transistor 65 through two series-connected transistors 63, 64. Source and drain of the second power transistor 65 are connected in parallel to the two terminals of the thermal resistor $R_{T2}$. When the power interruption detection circuit 40 outputs a high level signal, the first/second power transistor 62, 64 are both conductive, and the thermal resistor $R_{T2}$ is isolated from the circuit. On the contrary, when the power interruption detection circuit 40 outputs a low level signal, the second power transistor 65 is opened due to disconnection, so as to make the thermal resistor $R_{T2}$ interfere in the circuit. In this second embodiment, the electrical switch SW2 uses the photo coupler for power isolation.

Figure 6:
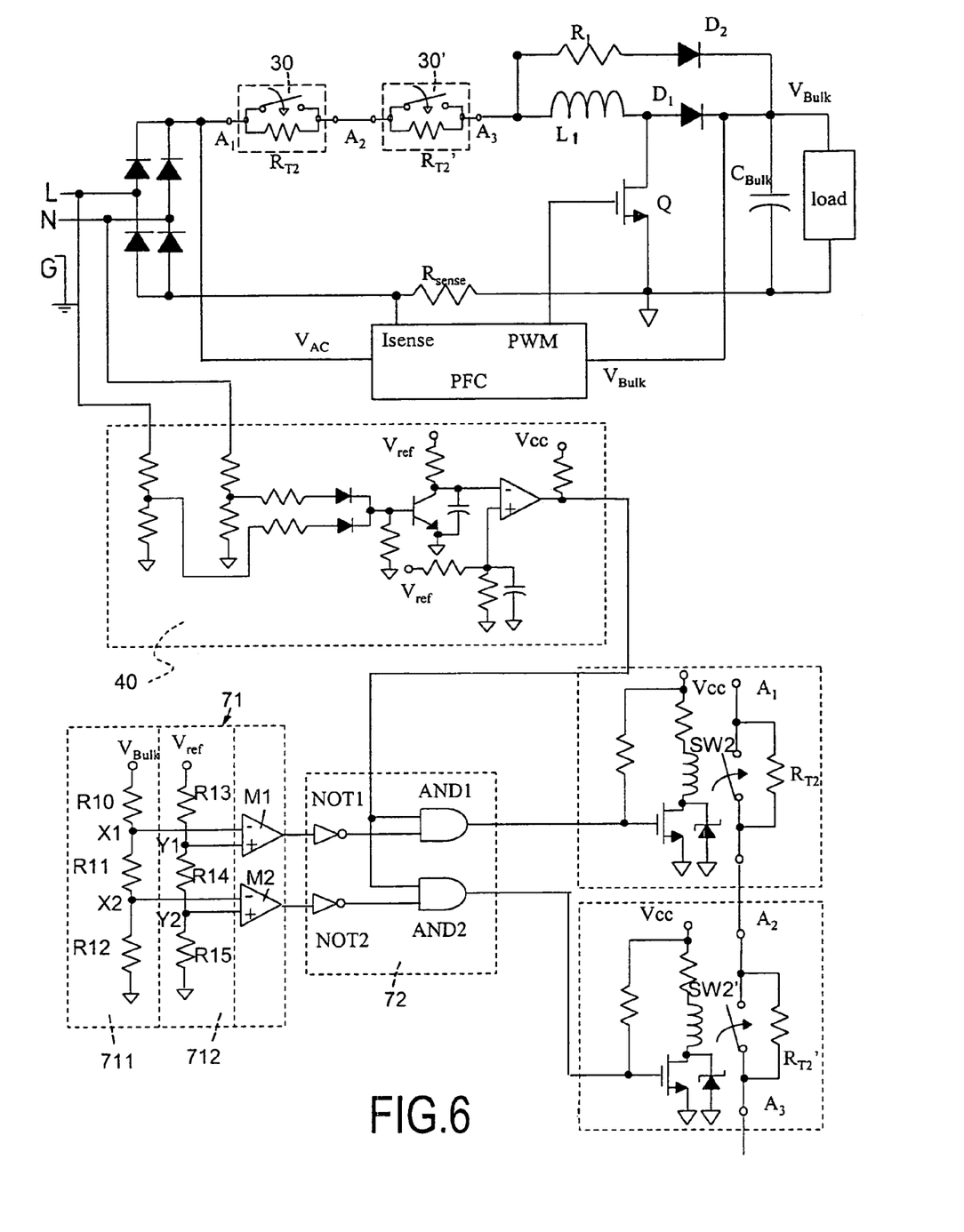
FIG. 6 shows a circuit diagram of a second embodiment of the AC/DC converter in accordance with the present invention.

With reference to FIG. 6, a detailed circuit diagram of a second embodiment of the present invention is shown. The basic structure of the second embodiment is similar to the first embodiment. The difference is that the second embodiment uses two second restraining units 30, 30', an output voltage detection circuit 71 and a logic determination circuit 72 to determine a sequence of the two second restraining units 30, 30' to interfere in the circuit by using an output voltage $V_{Bulk}$ to judge the power loss period. Moreover, the two second restraining units 30, 30' also can cooperate with the first restraining unit 20 or operate independently. In the second embodiment, the second restraining units work independently for example.

The output voltage detection circuit 71 includes two comparators M1, M2. Positive and negative input terminals of the comparators M1, M2 are respectively connected to nodes X1, X2 and Y1, Y2 of two voltage divider circuits 711, 712. Each of the voltage divider circuits 711, 712 is made up of a plurality of resistors R10-R12 and R13-R15. One terminal of the series-connected resistors R10-R12 is connected to the output terminal $V_{Bulk}$ of the AC/DC converter and another terminal of the series-connected resistors R13-R15 is connected to a reference voltage source Vref.

The logic determination circuit 72 includes two AND gates, AND1 and AND2. Two input terminals of the two AND gates are connected to an output terminal of the power interruption detection circuit 40, and the other two input terminals of the AND gates are respectively connected to output terminals of the comparators M1, M2 of the output voltage detection circuit 71 through a NOT gates, NOT1 and NOT2.

The operation of the aforesaid second embodiment is described as follows. During an initial period of the startup of the power supply, the output voltage $V_{Bulk}$ of the AC/DC converter is very low. The voltage level at each of the positive input terminals of the two comparators M1, M2 is higher than the negative input terminals of the two comparators M1, M2. Hence each of the comparators M1, M2 outputs a high level signal. The two AND gates AND1, AND2 output low electric potential. The two electrical switches SW2, SW2' are also opened, so that the two thermal resistors $R_{T2}$, $R_{T2}'$ of the second restraining units 30, 30' both interfere in the circuit to restrain the inrush current.

When the output voltage $V_{Bulk}$ of the AC/DC converter is rising, the voltage of the node X2 of the voltage divider circuit 711 is higher than the voltage of the node Y2 of the voltage divider circuit 712. Hence the comparator M2 outputs low electric potential, and the corresponding AND gate AND2 outputs high electric potential to make the power transistor of the electrical switch SW2' and the contacts of the relay conductive and make the thermal resistor $R_{T2}'$ short.

Moreover, when the voltage of the node X1 of the voltage divider circuit 711 is higher than the voltage of the node Y1 of the voltage divider circuit 712, the comparator M1 outputs low electric potential, and the corresponding AND gate AND1 outputs high electric potential to make the power transistor of the electrical switch SW2 and the contacts of the relay conductive and make the thermal resistor $R_{T2}$ short.

During the power loss period, the power interruption detection circuit 40 outputs low electric potential, the two gates AND1 and AND2 outputs low electric potential, so as to make the contacts of the relays of the two electrical switches SW2, SW2' open and the two thermal resistors $R_{T2}$, $R_{T2}'$ both interfere to the circuit to restrain the inrush current when the power supply recovers.

If the power supply is normal, the power interruption detection circuit 40 continues to monitor whether there is any power interruption and regularly outputs high electric potential. During the power loss period, the output voltage detection circuit 71 and the logic determination circuit 72 work together based on the voltage variation of the output voltage $V_{Bulk}$ to arrange the thermal resistor $R_{T2}$, $R_{T2}'$ to sequentially interfere in the circuit to restrain the inrush current when the power supply recovers.

It can be understood from the above detailed description that a core technique of the present invention is to make use of the power interruption detection circuit 40 to operate in coordination with the second restraining unit 30 to control whether the thermal resistor should interfere in the circuit. The following introduction focuses on several preferred embodiments of the power interruption detection circuit 40.

Figure 7:
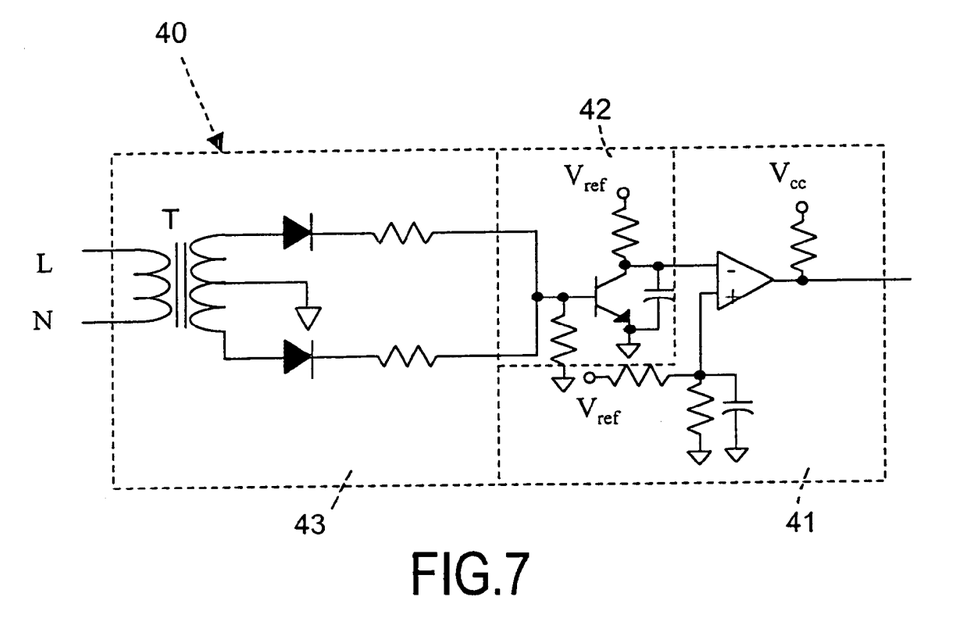
FIG. 7 shows a practicable circuit diagram of a power interruption detection circuit.

With reference to FIG. 7, the difference in the power interruption detection circuit 40 of the second embodiment with the first embodiment is illustrated. In the second embodiment, the AC synchronous signal detection circuit 43 comprises a transformer T and an adder circuit. A primary side of the transformer T is connected to AC power source terminals L, N and a secondary side is connected to an integrating circuit 42 through the adder circuit. Moreover, by using the transformer T, the AC power source also can be converted to a synchronous wave for resetting the integrating circuit 42.

Figure 8:
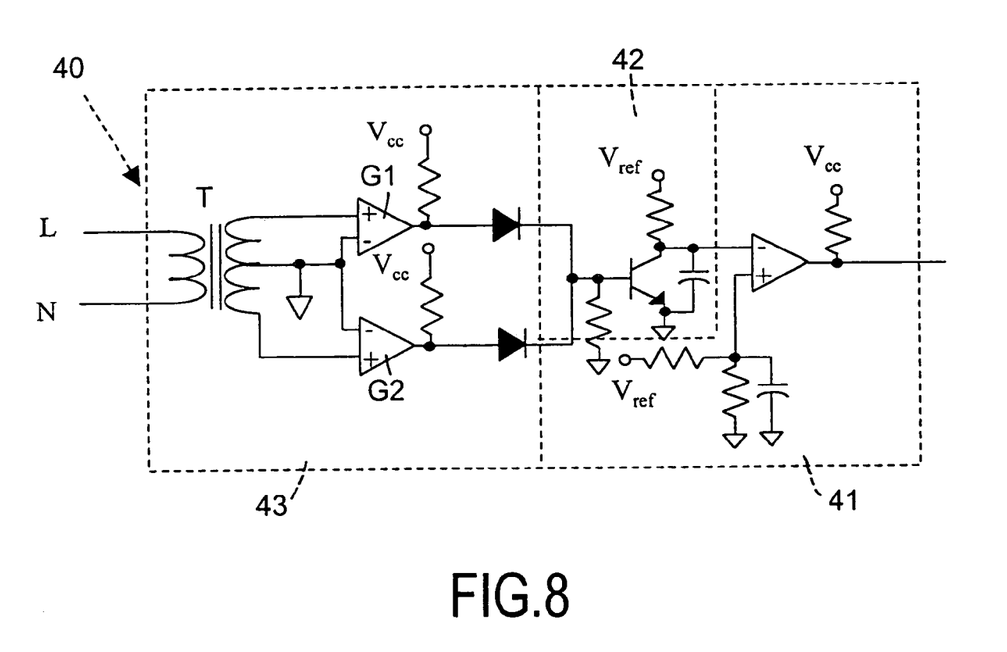
FIG. 8 shows a second practicable circuit diagram of a power interruption detection circuit of the AC\DC converter in FIG 6.

With reference to FIG. 8, the AC synchronous signal detection circuit 43 of the power interruption detection circuit 40 includes a transformer T and two comparators G1, G2. The two comparators G1, G2 execute zero-crossing to generate a synchronous wave.

Figure 9:
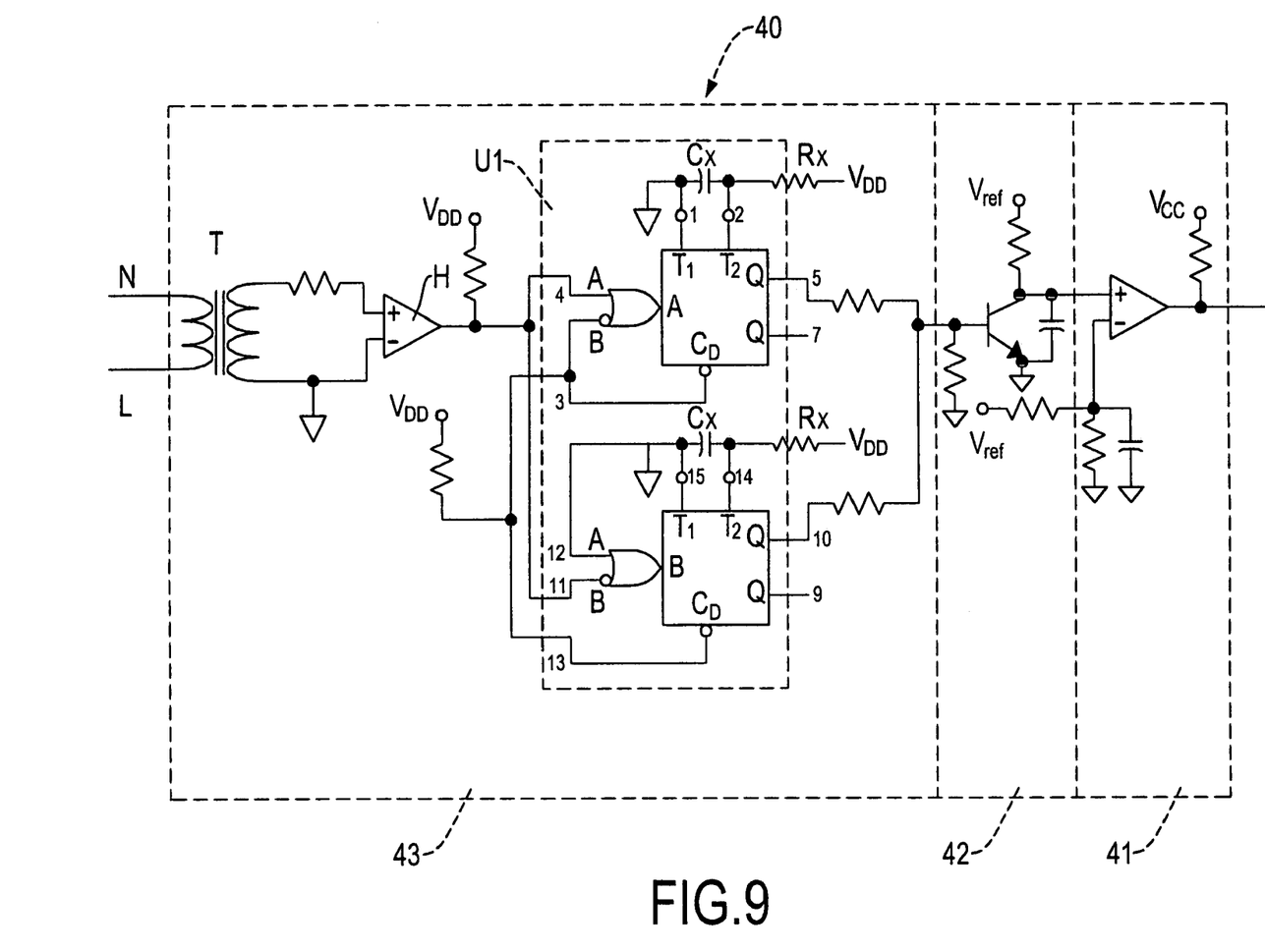
FIG. 9 further shows another practicable circuit diagram of a power interruption detection circuit of the second preferred embodiment of the present invention.
Figure 10:
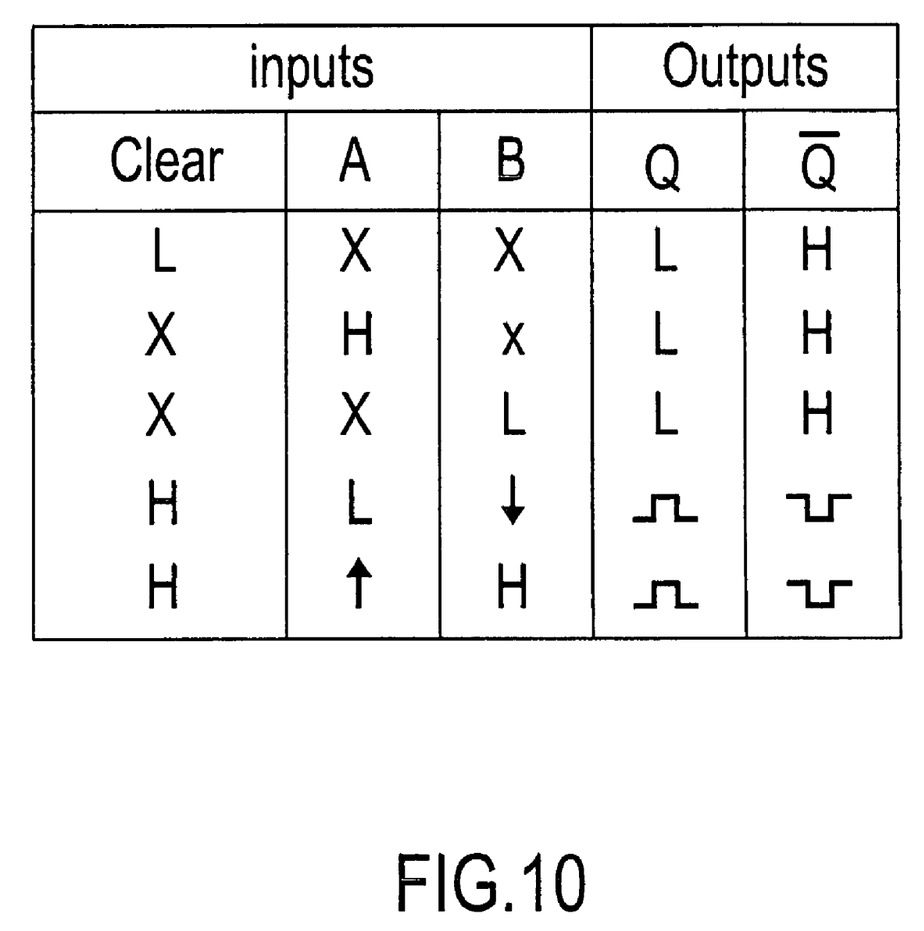
FIG. 10 shows a truth table of a single-shot circuit of the power interruption detection circuit of the second preferred embodiment of the present invention.

With reference to FIG. 9, the power interruption detection circuit 40 includes a transformer T, a comparator H and a single-shot circuit U1. An output terminal of the comparator H generates a square wave of the same frequency as the power source. Positive edge and negative edge of the square wave respectively trigger the single-shot circuit U1 to generate a synchronous wave. The truth table of a single-shot circuit U1 is shown in FIG. 10.

Figure 11:
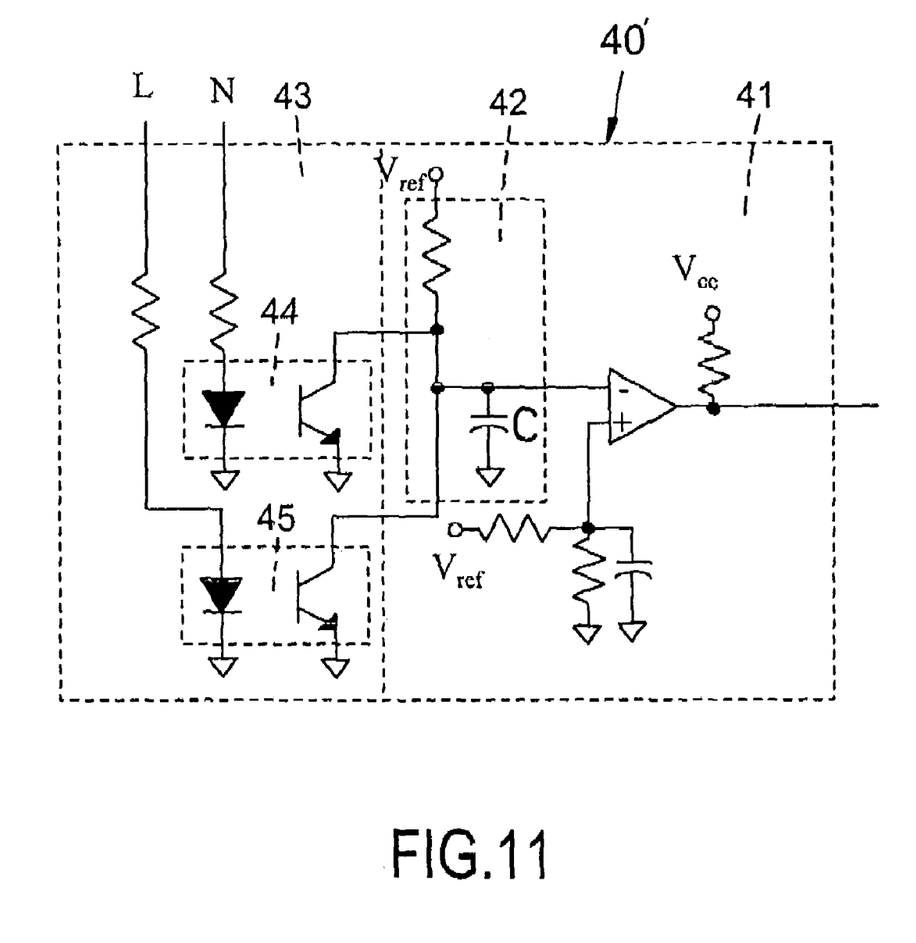
FIG. 11 further shows another practicable circuit diagram of a power interruption detection circuit of the second preferred embodiment of the present invention.

FIG. 1 further discloses another practicable embodiment of a power interruption detection circuit 40'. The difference in the power interruption detection circuit 40' and that of the first embodiment is described as follows.

The AC synchronous signal detection circuit 43 is made up of two optical couplers 44, 45. Two input terminals of the optical couplers 44, 45 are respectively connected to the two AC power source terminals L, N. Two output terminals of the optical couplers 44, 45 are mutually connected to an integrating circuit 42. The integrating circuit 42 is further connected to the comparison circuit 41. Since the input/output terminals of the optical couplers 44, 45 are made up of a coupling of a photo diode and a photo transistor, when the AC power cycle is stable without loss, the charge voltage of the capacitor C discharges periodically. However, when the AC power cycle is interrupted, the photo transistor becomes disconnected and the capacitor C continues to be charged to make the voltage rise until the voltage is higher than the reference voltage of the comparison circuit 41. Then the comparison circuit 41 outputs a low level signal to make the thermal resistor of the second restraining units 30 interfere to the circuit to restrain the inrush current when the power supply recovers.

The aforesaid output voltage detection circuit 71 and the logic determination circuit 72 can be implemented as a microprocessor, so as to implement objectives of multi-restraining units and multi-interruptions easily.

To conclude, it can be understood from the above description that the present invention uses the power interruption detection circuit to detect whether or not an AC power wave cycle is regular, so as to determine whether the thermal resistor of the second restraining units should interfere in the circuit to restrain the current surge when the power supply recovers. By using the present invention, the conventional drawback of using a single restraining unit that is unable to handle the temporary power-off state of warm startup or quick startup can be improved. According to the present invention, during the temporary power-off state, the power interruption detection circuit can immediately detect the interruption of the AC power wave cycle and make the thermal resistor of the second restraining unit interfere in the circuit at once. Hence the current surge can be effectively restrained in any operational circumstance, so as to ensure stability of the power supply. Therefore the invention indeed has the characteristics of utility and non-obviousness.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An AC/DC converter comprising:
   a rectifier circuit for converting an input alternating current (AC) power source to a direct current (DC) power source;
   at least one restraining unit coupled to the DC power source of the rectifier circuit, the restraining unit comprising a resistor and a switch connected in parallel; and
   a power interruption detection circuit for detecting whether or not the input AC power source is regular, the power interruption detection circuit comprising:
   an AC synchronous signal detection circuit connected between the input AC power source and the rectifier circuit to provide a full-wave voltage signal;
   an integrating circuit connected to the AC synchronous signal detection circuit to receive the full-wave voltage signal and to charge or discharge a capacitor based on the full-wave voltage signal; and
   a comparison circuit having a first input terminal connected to the capacitor of the integrating circuit to obtain a voltage level of the capacitor; and
   a second input terminal receiving a default reference value so that the comparator compares the voltage of the capacitor with the default reference value the switch of the restraining unit should be turned on or turned off;
   wherein when the input AC power source is interruptive, the comparison circuit outputs a signal to change a state of the switch in the restraining unit to make the resistor of the restraining unit to restrain current; and
   wherein the integrating circuit comprises a transistor having a base connected to the AC synchronous signal detection circuit to receive the full-wave voltage signal and having an emitter and a collector;
   the capacitor connected to a power source through a resistor, and connected in parallel to the collector and the emitter of the transistor.

2. The AC/DC converter as claimed in claim 1, wherein the AC synchronous signal detection circuit comprises:
   a voltage divider circuit comprising two voltage dividers both being respectively connected to two terminals of the input AC power source; and
   an adder circuit, being connected to the voltage dividers and having an output terminal connected to the base of the transistor of the integrating circuit to provide the full-wave voltage signal.

* * * * *